(12) United States Patent
Kobayashi et al.

(10) Patent No.: US 8,650,007 B2
(45) Date of Patent: Feb. 11, 2014

(54) APPARATUS AND METHOD FOR EVALUATING DETERIORATION PERFORMANCE

(75) Inventors: Kiyoshi Kobayashi, Kameoka (JP); Kazuya Aoki, Kawasaki (JP)

(73) Assignees: Kyoto University, Kyoto (JP); Pasco Corporation, Tokyo (JP)

( * ) Notice: Subject to any disclaimer, the term of this patent is extended or adjusted under 35 U.S.C. 154(b) by 775 days.

(21) Appl. No.: 12/591,215

(22) Filed: Nov. 12, 2009

(65) Prior Publication Data

US 2011/0112807 A1 May 12, 2011

(51) Int. Cl.
*G06F 7/60* (2006.01)
*G06F 17/10* (2006.01)

(52) U.S. Cl.
USPC .................................................. 703/2; 703/6

(58) Field of Classification Search
USPC .......................................................... 703/6, 2
See application file for complete search history.

(56) References Cited

U.S. PATENT DOCUMENTS

| 6,556,924 B1* | 4/2003 | Kariyawasam et al. ......... 702/34 |
| 2005/0096963 A1* | 5/2005 | Myr et al. ...................... 705/10 |
| 2008/0221815 A1* | 9/2008 | Trost et al. ..................... 702/81 |
| 2010/0235203 A1* | 9/2010 | Baskin et al. ..................... 705/7 |

FOREIGN PATENT DOCUMENTS

JP     A-2006-177080     7/2006

* cited by examiner

*Primary Examiner* — Dwin M Craig
(74) *Attorney, Agent, or Firm* — Oliff PLC (57) ABSTRACT

When a manager uses an input device to input the inspected states of the degrees of soundness of a plurality of objects, a data receiving unit receives them as inspection data. A deterioration characteristic calculating unit calculates the average value of the deterioration characteristics of the objects based on data related to the degrees of soundness of the plurality of objects that is received by the data receiving unit. A heterogeneous parameter calculating unit calculates a heterogeneous parameter for each heterogeneous factor that cannot be observed or is difficult to observe, and causes a variation in the deterioration characteristics. A benchmarking unit evaluates the influence of the heterogeneous factors on the deterioration characteristics based on the heterogeneous parameters, and an output unit outputs the evaluation result.

6 Claims, 7 Drawing Sheets

FIG. 1

| RATING | PHYSICAL MEANING (RC FLOOR SLAB) |
|---|---|
| 1 | NEWLY CONSTRUCTED STATE. THERE IS LITTLE SIGN OF DETERIORATION |
| 2 | BETWEEN RATINGS 1 AND 3 |
| 3 | WATER LEAKAGE IS OBSERVED IN A PORTION OF OBJECT (A PORTION OF OBJECT IS CRACKED IN ONE DIRECTION WITH WATER LEAKAGE AND SPOT-SHAPED WATER LEAKAGE OCCURS AT END OF OBJECT) |
| 4 | BETWEEN RATINGS 3 AND 5 |
| 5 | WATER LEAKAGE IS OBSERVED IN 75% OR MORE OF FLOOR SLAB. A PORTION OF OBJECT PEELS OFF. FREE LIME ISOBSERVED ALONG FLANGE OF BEAM |
| 6 | BETWEEN RATINGS 5 AND 7 |
| 7 | SERIOUS PEELING-OFF OR FREE LIME IS OBSERVED. OMISSION OR TENDENCY THEREOF IS OBSERVED |

APPARATUS AND METHOD FOR EVALUATING DETERIORATION PERFORMANCE

BACKGROUND OF THE INVENTION

1. Field of the Invention

The present invention relates to an apparatus and method for evaluating deterioration performance.

2. Description of the Related Art

It is an important problem to establish an optimized rehabilitation strategy capable of reducing a life cycle cost required for maintenance in the asset management of, for example, bridges and roads. Therefore, various methods have been proposed which quantitatively predict the deterioration of civil infrastructures, such as bridge and road.

For example, Japanese Patent Application Laid-Open (JP-A) No. 2006-177080 discloses a bridge maintenance management plan support system that quantitatively and objectively evaluates the degree of soundness of a member of the bridge and predicts the deterioration of the member over time.

However, in the related art, it is difficult to evaluate a difference in deterioration processes caused by heterogeneous factors that cannot be observed or that are difficult to observe based on a difference in the environmental conditions of the location where the civil infrastructures are installed or a difference in quality when the civil infrastructures are constructed.

SUMMARY OF THE INVENTION

The invention has been made in order to solve the above-mentioned problems, and an object of the invention is to provide an apparatus and method for evaluating the deterioration processes of objects including heterogeneous factors that cannot be observed or are difficult to observe.

According to a first aspect of the invention, there is provided an apparatus for evaluating deterioration performance of plural objects. The apparatus includes: a deterioration characteristic calculating unit that calculates deterioration characteristics of the plural objects for each observable deterioration factor based on the degrees of soundness of the plural objects; and a heterogeneous parameter calculating unit that calculates a heterogeneous parameter, which is an index for a variation in the deterioration characteristics, for each heterogeneous factor that cannot be observed or is difficult to observe, and causes the variation in the deterioration characteristics.

According to a second aspect of the invention, the apparatus for evaluating deterioration performance of plural objects according to the first aspect may further include a benchmarking unit that evaluates an influence of the heterogeneous factor on the deterioration characteristics based on a magnitude relationship between the heterogeneous parameters.

According to a third aspect of the invention, in the apparatus for evaluating deterioration performance of plural objects according to the first or second aspect, the deterioration characteristic calculating unit may calculate the deterioration characteristics as a maximum likelihood estimated value where a log likelihood function indicating simultaneous occurrence probability density of deterioration processes of the plural objects is the maximum.

According to a fourth aspect of the invention, in the apparatus for evaluating deterioration performance of plural objects according to any one of the first to third aspects, the heterogeneous parameter calculating unit may calculate a partial log likelihood indicating the simultaneous occurrence probability density of the objects with the heterogeneous factors, and calculate the heterogeneous parameter as an optimized solution when the partial log likelihood is conditionally maximized.

According to a fifth aspect of the invention, the apparatus for evaluating deterioration performance of plural objects according to any one of the second to fourth aspects may further include an output unit. The benchmarking unit may create deterioration curves indicating relative deterioration characteristics of each object in a coordinate system in which a horizontal axis indicates time elapsed and a vertical axis indicates the degree of soundness, and the output unit may output each of the deterioration curves created based on the values of the heterogeneous parameters.

According to a sixth aspect of the invention, there is provided a method of evaluating deterioration performance of plural objects. The method includes: acquiring deterioration speeds of the plural objects; calculating deterioration characteristics of the plural objects for each observable deterioration factor based on the deterioration speeds; and calculating a heterogeneous parameter, which is an index for a variation in the deterioration characteristics, for each heterogeneous factor that cannot be observed or is difficult to observe, and causes the variation in the deterioration characteristics.

DESCRIPTION OF THE PREFERRED EMBODIMENTS

Hereinafter, exemplary embodiments (hereinafter, referred to as embodiments) of the invention will be described with reference to the accompanying drawings.

Figure 1:
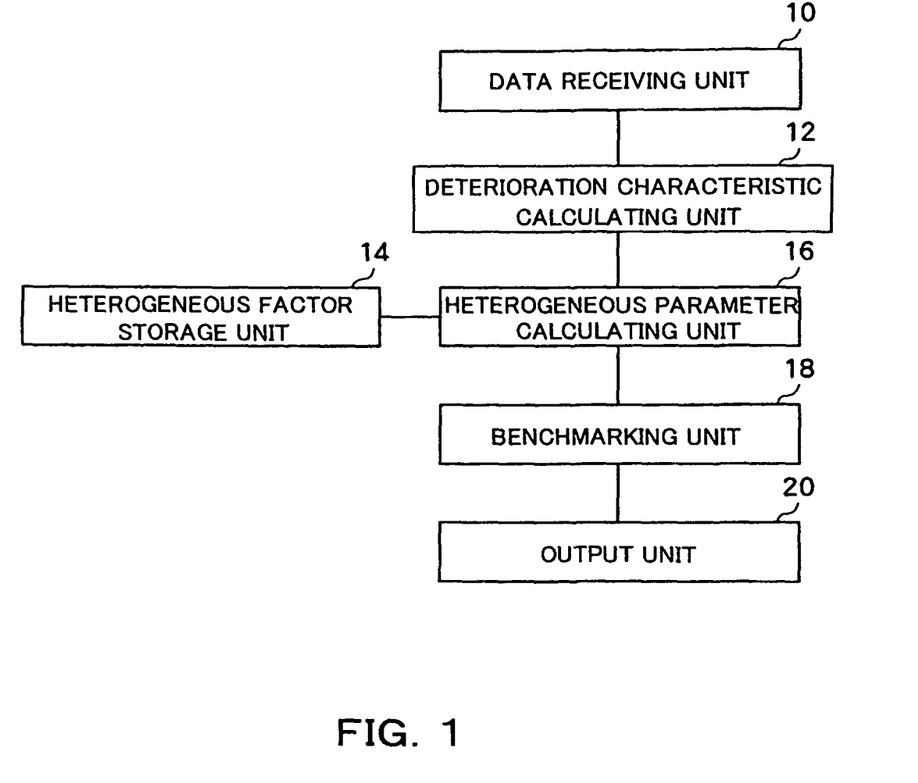
FIG. 1 is a functional block diagram illustrating a deterioration performance evaluating apparatus according to an embodiment of the invention.

FIG. 1 is a functional block diagram illustrating a deterioration performance evaluating apparatus according to an embodiment of the invention. In FIG. 1, the deterioration performance evaluating apparatus is implemented on a computer and includes a data receiving unit 10, a deterioration characteristic calculating unit 12, a heterogeneous factor storage unit 14, a heterogeneous parameter calculating unit 16, a benchmarking unit 18, and an output unit 20.

The data receiving unit 10 is implemented by a central processing unit (for example, a CPU may be used) and a program for controlling the processing operation of the CPU, and receives data (observed values) related to the degrees of soundness of objects, such as civil infrastructures which includes bridges and roads which is input from a manager of the objects through an input device. The input device may be composed of, for example, a keyboard and a pointing device, an appropriate disk drive device, or an appropriate communication interface, such as a USB (universal serial bus) port or a network port. In addition, the degree of soundness is represented by ratings obtained by classifying the degree of deterioration of the function or performance of a newly constructed object over time into plural levels.

Figure 2:
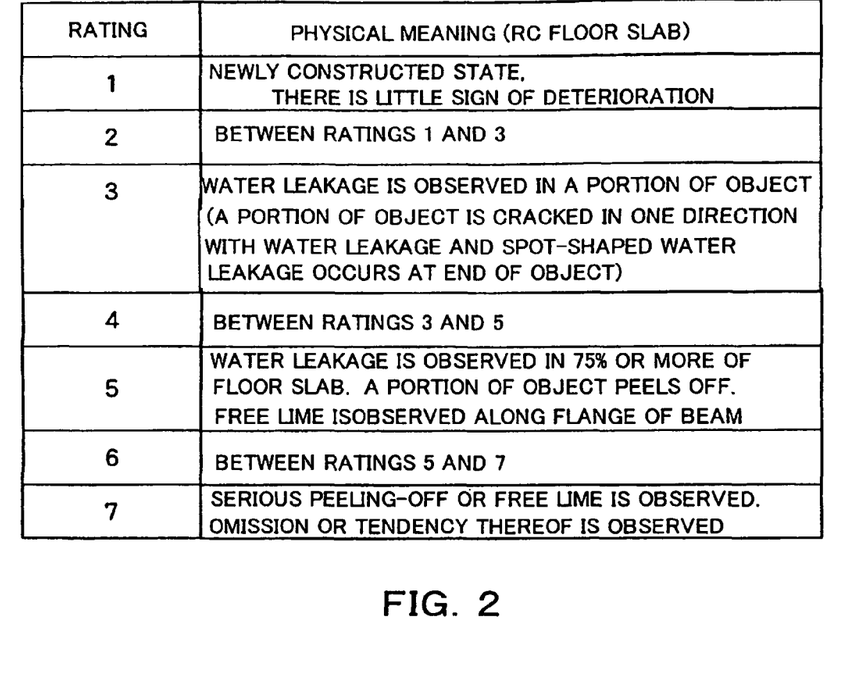
FIG. 2 is a diagram illustrating an example of the degree of soundness.

FIG. 2 is a diagram illustrating an example of the degree of soundness. FIG. 2 shows seven rating evaluation standards of a visual inspection for an RC floor slab, which is a bridge member to which a wheel load is directly applied and is an important member in terms of maintenance. The rating evaluation standards are defined by New York City. In FIG. 2, the state of the RC floor slab is classified from the highest rating "1" indicating a newly constructed state to rating "7" according to the degree of deterioration. Therefore, in this embodiment, the higher the rating, the more severe the deterioration of the RC floor slab.

Returning to FIG. 1, the deterioration characteristic calculating unit 12 is implemented by the CPU and the program for controlling the processing operation of the CPU, and calculates the deterioration characteristics of plural objects for each observable deterioration factor based on the data related to the degree of soundness received by the data receiving unit 10. The observable deterioration factors are quantifiable deterioration factors, such as the amount of traffic, weather conditions of the construction site, materials, and the construction date of the bridge or road. In addition, the deterioration characteristics mean a probability density function indicating the probability that the rating of a constructed object will be increased by one level over time. The probability density function is referred to as a hazard function, which will be described in detail below.

The heterogeneous factor storage unit 14 is implemented by a computer-readable storage device, such as a RAM (random access memory) or a hard disk device, and a program for allowing the CPU to control the storage device, and stores heterogeneous factors which cannot be observed or are difficult to observe, and causes a variation in deterioration characteristics. The heterogeneous factors include factors that cannot be quantitatively observed or are difficult to quantitatively observe, that is, the factors are peculiar to each bridge which has the same characteristic values which is, for example, construction conditions and RC floor slabs. The heterogeneous factors are stored so as to be associated with the objects.

The heterogeneous parameter calculating unit 16 is implemented by the CPU and the program for controlling the processing operation of the CPU, and calculates a heterogeneous parameter ($\epsilon^k$) indicating a variation in the deterioration characteristics for each of the heterogeneous factors stored in the heterogeneous factor storage unit 14. The heterogeneous factors may be designated by the manager, instead of being acquired from the heterogeneous factor storage unit 14. The heterogeneous parameter will be described below.

The benchmarking unit 18 is implemented by the CPU and the program for controlling the processing operation of the CPU, and evaluates the influence of the heterogeneous factors on the deterioration characteristics based on the magnitude relationship between the heterogeneous parameters calculated by the heterogeneous parameter calculating unit 16. For example, a method of creating deterioration curves that indicate the relative deterioration characteristics of each object is used in order to evaluate the influence of the heterogeneous factors on the deterioration characteristics.

The output unit 20 is implemented by the CPU and the program for controlling the processing operation of the CPU, and outputs the evaluation result of the benchmarking unit 18 to a display device, or a data output unit, such as a printing device.

Next, the process of the deterioration characteristic calculating unit 12 calculating the deterioration characteristics of plural objects for each observable deterioration factor will be described.

Figure 3:
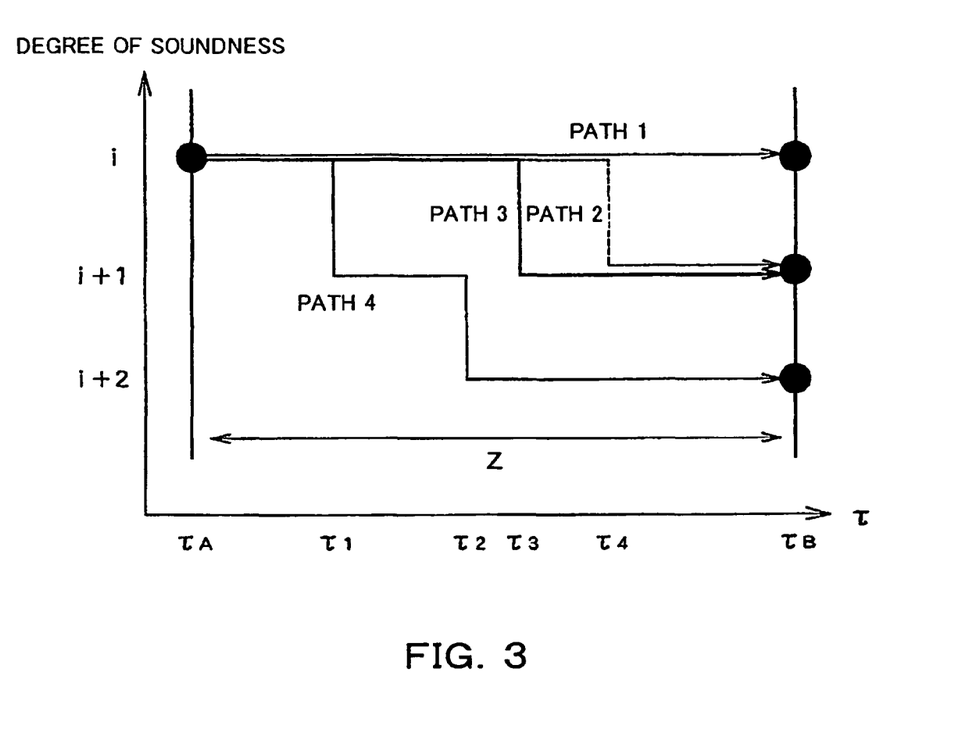
FIG. 3 is a diagram illustrating the deterioration process of an object.

FIG. 3 is a diagram illustrating the deterioration process of an object such as a bridge. In FIG. 3, the horizontal axis indicates the time τ elapsed from the construction of an object and the vertical axis indicates the degree of soundness. In this embodiment, a state (rating) indicating the degree of soundness is represented by a state variable i (i is an integer). For example, the state is represented by three stages, that is, i, i+1, and i+2. The manager inspects the object for specific deterioration factors, such as the amount of traffic and materials, at two points in time $\tau_A$ and $\tau_B$, and checks the degree of soundness of the object.

FIG. 3 shows four kinds of deterioration processes. A path 1 indicates that no deterioration occurs during the period between two points of time ($\tau_A$ and $\tau_B$) and the state i of the object is observed as the degree of soundness by two inspections. In paths 2 and 3, at times $\tau_4$ and $\tau_3$, the degree of soundness deteriorates from the state i to the state i+1, and the state i+1 is observed at the time ($\tau_B$) during the second inspection. In a path 4, at times $\tau_1$ and $\tau_2$, the degree of soundness of the object is changed from the state i to the state i+1 and from the state i+1 to the state i+2, respectively. In each case described above, the manager can observe the degree of soundness at the two points in time, but cannot observe the times ($\tau_1$, $\tau_2$, $\tau_3$, and $\tau_4$) when the degree of soundness is actually changed. Therefore, a probability process (Markov deterioration model) is introduced to estimate a change in the degree of soundness (deterioration process).

When the deterioration process shown in FIG. 3 is the Markov deterioration model, the degree of soundness of the object observed at the time $\tau_A$ is represented by a state variable $h(\tau_A)$, the degree of soundness of the object observed at the time $\tau_B$ is represented by a state variable $h(\tau_B)$, and the degree of soundness of the object observed at the time $\tau_A$ is $h(\tau_A)=i$, a conditional transition probability (Markov transition probability) that the degree of soundness is $h(\tau_B)=j$ during the inspection at the time $\tau_B$ is represented by $Pr[h(\tau_B)=j|h(\tau_A)=i]=\pi_{ij}$. When the transition probability is calculated for a set (i, j) of the degrees of soundness, a Markov transition probability matrix may be represented by Equation 1 given below:

$$\Pi = \begin{pmatrix} \pi_{11} & \cdots & \pi_{1J} \\ \vdots & \ddots & \vdots \\ 0 & \cdots & \pi_{JJ} \end{pmatrix} \quad \text{[Equation 1]}$$

When the object is not repaired, the deterioration is not improved. Therefore, when i>j, is $\pi_{ij}=0$. In addition, the following Equation 2 is obtained by the definition of the transition probability:

$$\sum_{j=i}^{J} \pi_{ij} = 1 \quad \text{[Equation 2]}$$

Figure 4:
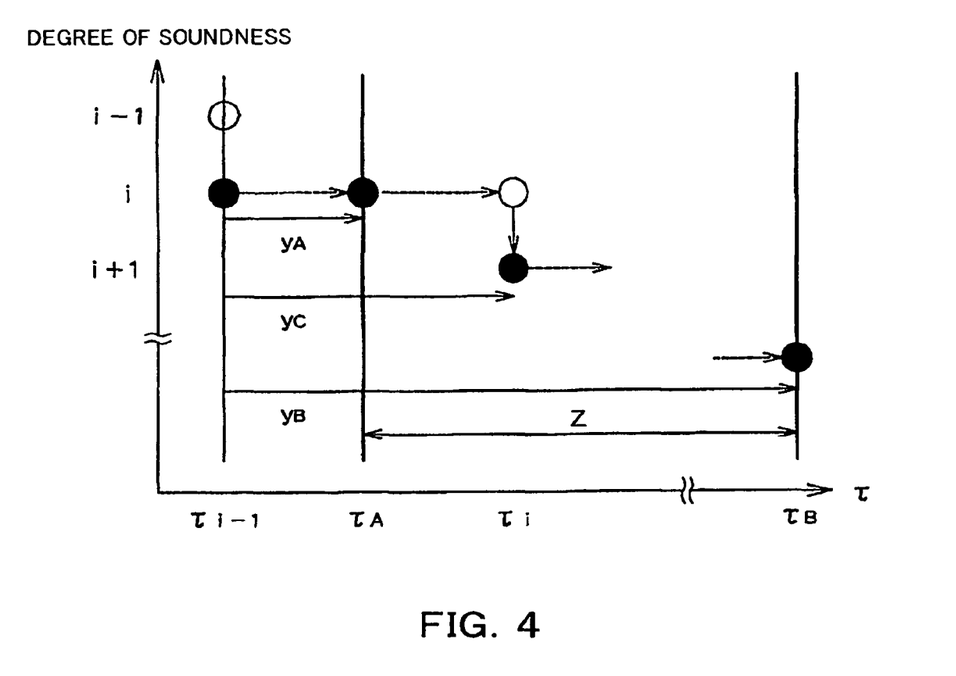
FIG. 4 is a diagram illustrating a method of formulating a Markov transition probability.

FIG. 4 is a diagram illustrating a method of formulating the Markov transition probability. In FIG. 4, at a time $\tau_{i-1}$, the degree of soundness is changed from i−1 to i, and at a time $\tau_j$, the degree of soundness is changed from i to i+1. The time axis is set such that the time $\tau_{i-1}$ is an initial time ($y_i$=0). In this case, the time $\tau_A$ is $y_A$ and the time $\tau_B$ is $y_B$ on the time axis. As shown in FIG. 4, the length of the period for which the degree of soundness of the object is i (the life span of the degree of soundness of i) is $\zeta_i$=$y_C$. The life span $\zeta_i$ of the degree of soundness i is a probability variable, and the following Equation 3 is established between a probability density function $f_i(\zeta_i)$ and a distribution function $F_i(\zeta_i)$:

$$F_i(y_i) = \int_0^{y_i} f_i(\zeta_i) d\zeta_i \quad \text{[Equation 3]}$$

In addition, the probability that the degree of soundness will be i during the period from an initial time $y_i$=0 (time $\tau_{i-1}$) to an inspection time $y_i$ may be defined by $\Pr\{\zeta_i \geq y_i\}$= $\tilde{F}_i(\zeta_i)$=$-F_i(\zeta_i)$. Here, a conditional probability that the degree of soundness will be maintained at the state i until the time $y_i$ and deteriorate to the state i+1 during the period between the time $y_i$ and the time $y_i+\Delta y_i$ may be represented by Equation 4 given below:

$$\lambda_i(y_i)\Delta y_i = \frac{f_i(y_i)\Delta y_i}{\tilde{F}_i(y_i)} \quad \text{[Equation 4]}$$

The probability density $\lambda_i(y_i)$ is called a hazard function. It is possible to define hazard functions, the number of which is obtained by subtracting 1 from the number of states of the degree of soundness. As the value of the hazard function is reduced, the deterioration speed is reduced.

As described above, when the deterioration process is the Markov deterioration model and the hazard function is constant without depending on the time, the following exponential hazard function is established: $\lambda_i(y_i)$=$\theta_i$ ($\theta_i$ is a positive constant). As such, since the exponential hazard function is constant without depending on the time, it is possible to achieve a Markov property that the deterioration process does not depend on the previous history. In addition, the probability $\tilde{F}_i(y_i)$ that the life span of the degree of soundness i will be equal to or more than $y_i$ is represented by the following equation: $\tilde{F}_i(y_i)$=$\exp(-\theta_i y_i)$.

When the exponential hazard function is used, it is possible to formulate the Markov transition probability it $\pi_{ij}$ (i=1, . . . , I−1; j=i+1, . . . , I) that the degree of soundness will be changed from i to j during the two points of time (between $\tau_A$ and $\tau_B$) as Equation 5 given below:

$$\pi_{ij} = \sum_{k=i}^{j} \prod_{m=i}^{k-1} \frac{\theta_m}{\theta_m - \theta_k} \prod_{m=k}^{j-1} \frac{\theta_m}{\theta_{m+1} - \theta_k} \exp(-\theta_k Z) \quad \text{[Equation 5]}$$

where $$\prod_{m=i}^{k-1} \frac{\theta_m}{\theta_m - \theta_k} = 1 \ (k=i)$$

$$\prod_{m=k}^{j-1} \frac{\theta_m}{\theta_{m+1} - \theta_k} = 1 \ (k=j)$$

(where z is the interval ($y_B - y_A$) between the first inspection and the second inspection).

The deterioration characteristic calculating unit 12 calculates the above-mentioned exponential hazard function $\theta_i$ as the deterioration characteristics of the object.

Next, the process of the heterogeneous parameter calculating unit 16 calculating the heterogeneous parameter, which is an index for a variation in deterioration characteristics, will be described.

First, the deterioration characteristic calculating unit 12 divides plural objects into K groups, and calculates the average value (Ave$\theta^k_i$) of the deterioration characteristics (exponential hazard function) $\theta_i(l_k)$ of components $l_k$ belonging to each group k (k=1, 2, . . . , K). In this case, the components $l_k$ belonging to each group may be, for example, constructions, such as bridges, belonging to each group, or members of the constructions. In the case of the bridge, for example, the groups may be formed by classifying the amount of traffic, which is an observable deterioration factor, into large, middle, and small amount levels according to an appropriate standard and classifying plural bridges according to the amount of traffic.

Then, the heterogeneous parameter calculating unit 16 sets a heterogeneous factor that causes a variation in deterioration characteristics for each of the components $l_k$ belonging to each group k, and calculates a heterogeneous parameter $\epsilon^k$, which is an index for the variation. The heterogeneous parameter $\epsilon^k$ does not depend on the rating i. The heterogeneous parameter $\epsilon^k$ is a probability variable indicating the degree of separation of the deterioration characteristics of each group k from the average value (Ave$\theta^k_i$), and $\epsilon^k>0$ is established. $\epsilon^k$=1 corresponds to the average value of the deterioration characteristics of the groups k. If the value of the heterogeneous parameter $\epsilon^k$ is more than 1, the deterioration speed of the object is increased from the average value. If the value of the heterogeneous parameter $\epsilon^k$ is less than 1, the deterioration speed of the object is decreased from the average value. The deterioration characteristic $\theta_i(l_k)$ of each component $l_k$ is represented as a mixed exponential hazard function by the following Expression 1:

[Expression 1]

$$\theta_i(l_k) = \text{Ave}\theta^k_i \times \epsilon^k \quad (1)$$

For example, when the heterogeneous parameter $\epsilon^k$ is a probability sample extracted from a gamma distribution of which an average value is 1 and a variance is $1/\phi$, the Markov transition probability indicating an average deterioration transition is represented by Equation 6 given below:

$$\tilde{\pi}_{ij}(z) = \sum_{s=i}^{j} \frac{\psi^s_{ij}(\tilde{\theta})\phi^\phi}{(\tilde{\theta}_s z + \phi)^\phi} \quad \text{[Equation 6]}$$

$$\psi^s_{ij}(\tilde{\theta}) = \prod_{m=i, \neq s}^{j-1} \frac{\tilde{\theta}^k_m}{\tilde{\theta}^k_m - \tilde{\theta}^k_s}$$

In this case, a log likelihood function indicating a simultaneous occurrence probability that the observed values of the degrees of soundness (rating) of all the objects will be obtained at the same time is formulated by Equation 7 given below:

$$\ln L(\theta, \phi) = \sum_{i=1}^{I-1} \sum_{j=i}^{I} \sum_{k=1}^{K} \sum_{l_k=1}^{l_k} \delta^{l_k}_{ij} \ln \tilde{\pi}^{l_k}_{ij}(\bar{z}^{l_k}, \bar{x}^{l_k} : \theta, \phi) \quad \text{[Equation 7]}$$

-continued $$\bar{\delta}_{ij}^{l_k} = \begin{cases} 1 & h(\bar{\tau}_A^{l_k}) = i, \quad h(\bar{\tau}_B^{l_k}) = j \\ 0 & \text{(in the other cases)} \end{cases}$$

A partial log likelihood function indicating the simultaneous occurrence probability of the heterogeneous parameters is represented by Equation 8 given below:

[Equation 8]
$$\ln p^k(\epsilon^k : \theta, \phi, \xi^k) \propto \sum_{l_k=1}^{L_K} \bar{\delta}_{i(l_k)j(l_k)}^{l_k} \ln$$
$$\left\{ \sum_{m=i(l_k)}^{j(l_k)} \psi_{i(l_k)j(l_k)}^m (\tilde{\theta}^{l_k}(\hat{\beta}, \hat{\phi})) \exp(-\tilde{\theta}_m^{l_k}(\hat{\beta}, \hat{\phi})\epsilon^k \bar{z}^{l_k}) \right\} +$$
$$\{(\hat{\phi} - 1)\ln \epsilon^k - \hat{\phi}\epsilon^k\}$$
$$\tilde{\theta}_i^{l_k} = \exp(x^{l_k}\beta_i')$$

(where $x^{l_k}$ indicates an arbitrary observable characteristic vector of an object whose deterioration performance is predicted, and $\hat{\beta}$, $\hat{\phi}$ indicate the average value of the exponential hazard function and the maximum likelihood estimated value related to the probability distribution of the heterogeneous parameters).

The hat (^) added to the symbol in the above-mentioned equation indicates the estimated value, the tilde (~) added to the symbol indicates the average value, and the bar (‾) added to the symbol indicates the observed value.

In this case, the deterioration characteristic calculating unit 12 calculates the average value (Ave$\theta^k_i$) of the exponential hazard function indicating the average deterioration characteristics that do not consider the heterogeneity of the deterioration characteristics as the maximum likelihood estimated value where the log likelihood function indicating the simultaneous occurrence probability that the observed values of the degrees of soundness (rating) of all the objects will be obtained at the same time. In addition, the heterogeneous parameter calculating unit 16 calculates the heterogeneous parameter $\epsilon^k$ of each group k based on the average value (Ave$\theta^k_i$) of the exponential hazard function, using an optimized solution that conditionally (that is, on the assumption that the average value of the exponential hazard function is Ave$\theta^k_i$) maximizes the partial log likelihood indicating the simultaneous occurrence probability of the heterogeneous parameters of the objects belonging to the group k.

As described above, the heterogeneous parameter $\epsilon^k$ is based on the individual heterogeneous factors that are difficult to observe. For example, the heterogeneous parameter $\epsilon^k$ may be calculated for each of the heterogeneous factors that are stored in the heterogeneous factor storage unit 14 in advance. In addition, when the deterioration characteristics are inspected, the manager may set the heterogeneous parameter $\epsilon^k$.

Figure 5:
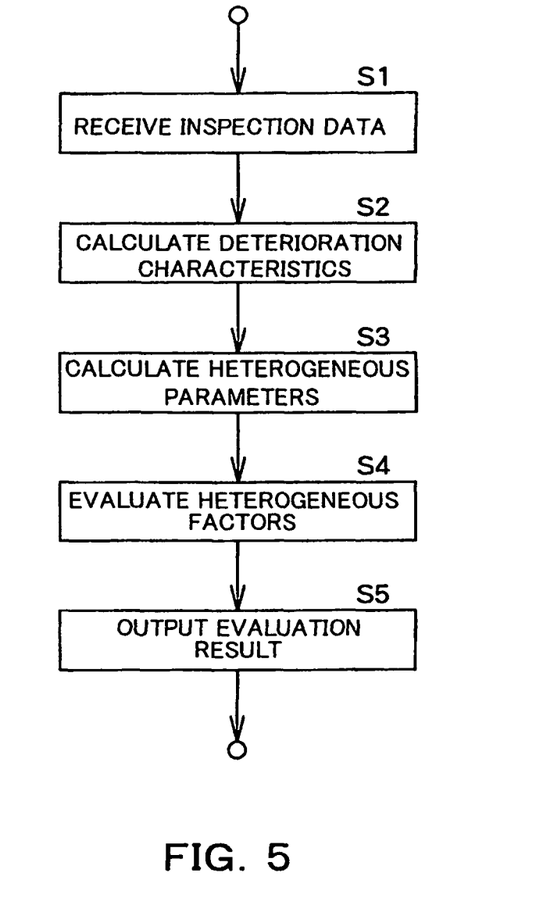
FIG. 5 is a flowchart illustrating an example of the operation of the deterioration performance evaluating apparatus according to the embodiment of the invention.

FIG. 5 is a flowchart illustrating an example of the operation of the deterioration performance evaluating apparatus according to this embodiment of the invention. In FIG. 5, when the manager uses the input device to input the states of the degrees of soundness of plural objects and the inspection date, the data receiving unit 10 receives them as inspection data (S1). The states of the degrees of soundness are determined by inspecting plural objects. The inspection is performed plural times at an appropriate time.

The deterioration characteristic calculating unit 12 calculates the average value (Ave$\theta^k_i$) of the deterioration characteristics $\theta_i(l_k)$ of the objects for each deterioration factor based on data (state) related to the degrees of soundness of the plural objects that is received by the data receiving unit 10 (S2).

The heterogeneous parameter calculating unit 16 calculates the heterogeneous parameter $\epsilon^k$ for each of the heterogeneous factors that are stored in the heterogeneous factor storage unit 14 or are designated by the manager (S3).

Then, the benchmarking unit 18 evaluates the influence of the heterogeneous factors on the deterioration characteristics based on the magnitude relationship between the heterogeneous parameters calculated by the heterogeneous parameter calculating unit 16 (S4), and the output unit 20 outputs the evaluation result of the benchmarking unit 18 (S5). In this case, for example, the benchmarking unit 18 may create a deterioration curve and an average deterioration curve shown in FIG. 7, which will be described below, and the output unit 20 may output the deterioration curve and the average deterioration curve.

Figure 6:
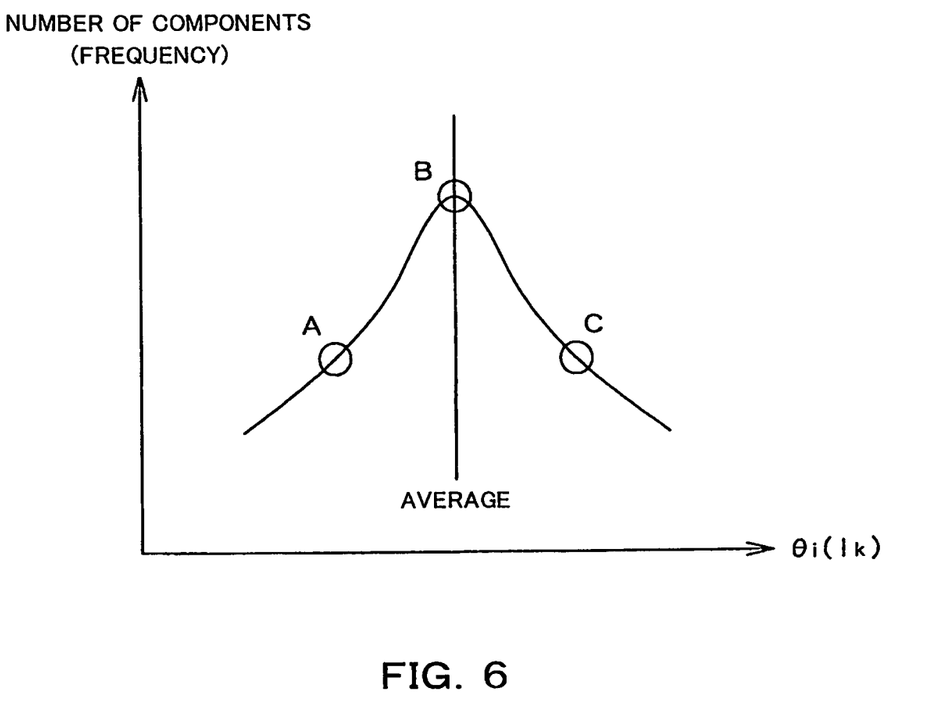
FIG. 6 is a conceptual diagram illustrating the magnitude relationship between heterogeneous parameters.

FIG. 6 is a conceptual diagram illustrating the magnitude relationship between the heterogeneous parameters output from the output unit 20. In FIG. 6, the horizontal axis indicates the deterioration characteristics $\theta_i(l_k)$, and the vertical axis indicates the number of components $l_k$ (frequency) for each of the deterioration characteristics $\theta_i(l_k)$. The average value (Ave$\theta^k_i$) of the deterioration characteristics $\theta_i(l_k)$ is represented by a vertical line. The heterogeneous parameter $\epsilon^k$ is represented by the distance from the average value (Ave$\theta^k_i$) in the horizontal axis direction.

In FIG. 6, the heterogeneous factors are represented by A, B, and C. The heterogeneous parameter $\epsilon^k$ is represented by the distance from the average value (Ave$\theta^k_i$) in the horizontal axis direction. In this case, the heterogeneous factors are peculiar to each bridge which has the same characteristic values which is, for example, construction conditions and RC floor slabs. The lower the deterioration characteristic $\theta_i(l_k)$, the slower the deterioration speed. Therefore, in Expression 1 defining the heterogeneous parameter $\epsilon^k$, as the deterioration speed is reduced, the heterogeneous parameter $\epsilon^k$ is decreased. Therefore, the heterogeneous factor C has the highest deterioration speed, followed by the heterogeneous factor B and the heterogeneous factor A (A<B<C). As such, it is possible to determine the relative merits of each heterogeneous factor based on the deterioration characteristics $\theta_i(l_k)$ and thus evaluate the factors that cannot be quantitatively observed or are difficult to quantitatively observe.

When the Markov deterioration model is used, it is possible to calculate a rating expected life span (the length of the expected period from the time when an object first reaches a predetermined rating to the time when the object deteriorates and reaches the next rating), which is a risk management index in asset management. That is, a rating expected life span $RMD_i$ is obtained by integrating the probability $F'_i(y_i)$ that the life span of the degree of soundness i will be equal to or more than $y_i$ from time 0 to infinity and is represented by Equation 9 given below:

[Equation 9]
$$RMD_i = \int_0^\infty \exp(-\theta_i y_i) d y_i = \frac{1}{\theta_i}$$

It is possible to use the above-mentioned equation to calculate a deterioration curve indicating the correspondence between the number of years elapsed from the initial time (when the rating is 1) and the average rating of the object. In addition, the deterioration curve may be created for each group or it may be created for all the objects regardless of the groups.

Figure 7:
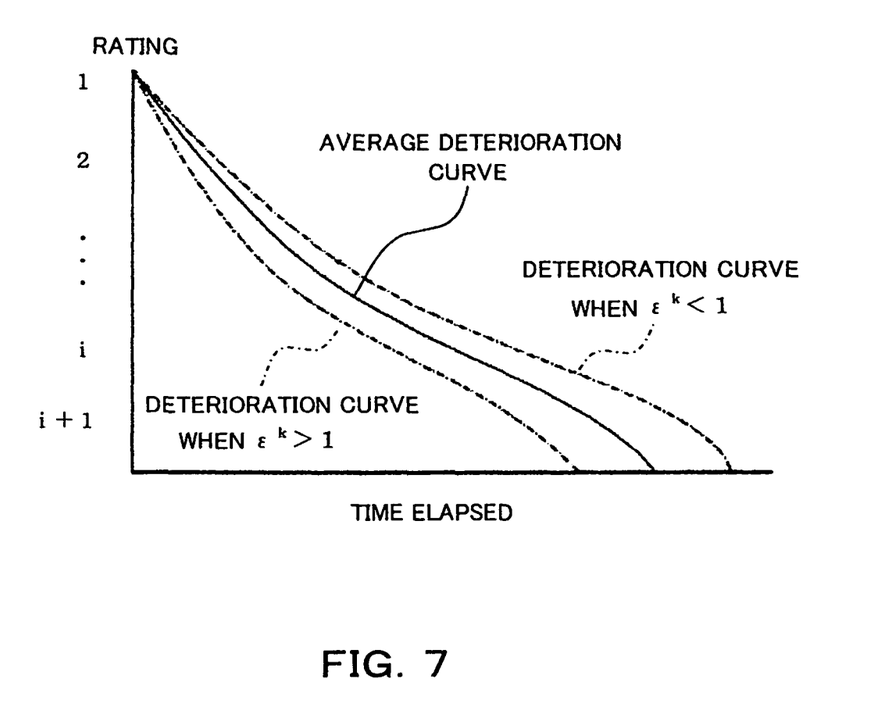
FIG. 7 is a diagram illustrating the relative evaluation of deterioration curves.

FIG. 7 shows an example of the deterioration curve and the average deterioration curve (a reference curve; a benchmark curve) created from the rating expected life span and the average value thereof (corresponding to the heterogeneous parameter $\epsilon^k=1$) by the benchmarking unit 18. The deterioration speed of the object disposed at the upper side of the average deterioration curve (corresponding to $\epsilon^k<1$) is less than the average value, and the deterioration speed of the object disposed at the lower side of the average deterioration curve (corresponding to $\epsilon^k>1$) is more than the average value.

It is possible to analyze the object having a large deviation from the average deterioration curve in detail based on the above-mentioned result to check the factors affecting the deterioration speed, in addition to the factors that are predicted to affect the deterioration speed when the groups are classified.

In this embodiment, the deterioration curve has been described as an example, but the invention is not limited thereto. For example, a variation in probabilistic deterioration distribution (probability distribution of rating) over time may be calculated for each heterogeneous parameter and the variations may be compared with each other to check the factors affecting the deterioration speed.

Although the exemplary embodiment of the invention has been described above, many changes and modifications will become apparent to those skilled in the art in view of the foregoing description which is intended to be illustrative and not limiting of the invention defined in the appended claims.

What is claimed is:

1. An apparatus including a processor with a memory that contains computer executable instructions for evaluating deterioration performance of a plurality of physical objects, comprising:
   a data receiving unit for receiving degrees of soundness having rating evaluation values of the plurality of physical objects;
   a deterioration characteristic calculating unit configured to use a Markov deterioration model to calculate deterioration characteristics indicating probability that the rating evaluation values of the plurality of physical objects are increased by one level, based on the degrees of soundness of the plurality of physical objects that are input into the data receiving unit for each observable deterioration factor; and
   a heterogeneous parameter calculating unit that sets a heterogeneous factor that is peculiar to each physical object, causes a variation indicating a degree of separation from an average value of the deterioration characteristic, and cannot be quantitatively observed, and calculates a heterogeneous parameter, which is an index for the variation in the deterioration characteristics, for each heterogeneous factor.

2. The apparatus for evaluating deterioration performance of a plurality of physical objects according to claim 1, further comprising:
   a benchmarking unit that evaluates an influence of the heterogeneous factor on the deterioration characteristics based on a magnitude relationship between the heterogeneous parameters.

3. The apparatus for evaluating deterioration performance of a plurality of physical objects according to claim 1,
   wherein the deterioration characteristic calculating unit calculates the deterioration characteristics as a maximum likelihood estimated value where a log likelihood function indicating simultaneous occurrence probability density of deterioration processes of the plurality of physical objects is the maximum.

4. The apparatus for evaluating deterioration performance of a plurality of physical objects according to claim 1,
   wherein the heterogeneous parameter calculating unit calculates a partial log likelihood indicating the simultaneous occurrence probability density of the physical objects with the heterogeneous factors, and calculates the heterogeneous parameter as an optimized solution when the partial log likelihood is conditionally maximized.

5. The apparatus for evaluating deterioration performance of a plurality of physical objects according to claim 2, further comprising:
   an output unit,
   wherein the benchmarking unit creates deterioration curves indicating relative deterioration characteristics of each physical object in a coordinate system in which a horizontal axis indicates time elapsed and a vertical axis indicates the degree of soundness, and
   the output unit outputs each of the deterioration curves created based on the values of the heterogeneous parameters.

6. A method of evaluating deterioration performance of a plurality of physical objects, comprising:
   acquiring deterioration speeds of the plurality of physical objects;
   calculating deterioration characteristics of the plurality of physical objects using a Markov deterioration model for each observable deterioration factor based on the deterioration speeds; and
   calculating a heterogeneous parameter, which is an index for a variation in the deterioration characteristics, for each heterogeneous factor that cannot be quantitatively observed, and causes the variation in the deterioration characteristics.

* * * * *